United States Patent [19]

Durand et al.

[11] Patent Number: 5,211,929
[45] Date of Patent: May 18, 1993

[54] PROCESS FOR THE THERMAL ACTIVATION OF ZEOLITES AND RESULTANT PRODUCTS

[75] Inventors: Guy Durand, Honfleur; Dominique Plee, Meulan; Daniel Delcroix, Surville Pont Eveque, all of France

[73] Assignee: CECA S.A., France

[21] Appl. No.: 709,608

[22] Filed: Jun. 3, 1991

Related U.S. Application Data

[63] Continuation-in-part of Ser. No. 442,597, Nov. 29, 1989, abandoned.

[30] Foreign Application Priority Data

Oct. 6, 1989 [FR] France .............................. 89 13065

[51] Int. Cl.⁵ .............................................. C01B 33/34
[52] U.S. Cl. .................................... 423/717; 502/60; 502/79
[58] Field of Search ............... 423/118, 326, 328, 329; 502/60, 74, 85, 86, 87, 79; 252/632; 208/111, 120

[56] References Cited

U.S. PATENT DOCUMENTS

| | | | |
|---|---|---|---|
| 2,882,243 | 4/1959 | Milton | 423/328 |
| 2,882,244 | 4/1959 | Milton | 502/79 |
| 3,009,776 | 11/1961 | Sensel | 423/118 |
| 3,071,479 | 1/1963 | Fulenwider | 106/11 X |
| 3,293,192 | 12/1966 | Maher et al. | 423/328 |
| 3,354,077 | 11/1967 | Hansford | 423/328 |
| 3,375,206 | 3/1968 | Shaw | 502/74 |
| 4,139,433 | 2/1979 | Ward | 208/111 |
| 4,263,163 | 4/1981 | Ross | 252/632 |
| 4,305,845 | 12/1981 | Tu | 208/120 |
| 4,370,174 | 1/1983 | Braithwaite | 252/163 X |
| 4,676,920 | 6/1987 | Culshaw | 252/163 |
| 4,693,840 | 9/1987 | Trinh et al. | 106/11 X |
| 4,851,200 | 7/1989 | Ryan | 423/118 |
| 4,869,842 | 9/1989 | Denis et al. | 252/163 X |

FOREIGN PATENT DOCUMENTS

| | | |
|---|---|---|
| 02182778 | 7/1990 | Japan .............................. 252/163 |
| WO85/01294 | 3/1985 | PCT Int'l Appl. |
| 2051660 | 1/1981 | United Kingdom |

OTHER PUBLICATIONS

Kerr, G. T. "Chemistry of Crystalline Aluminosilicates VII Thermal Decomposition Products of Ammonium Zeolite Y" J. Cat. 15 (1969) pp. 200–204.

Primary Examiner—R. Bruce Breneman

[57] ABSTRACT

The invention describes a process for thermal activation of zeolites that are sensitive to hydrothermal degradation by percolating a hot gas through a homogeneous bed of granulates of the said zeolites. It applies to type A an X zeolites, and more particularly to their forms exchanged by potassium or calcium and one preferably uses air, the temperature of which ranges between about 300° C. and 700° C., preferably between 550° C. and 600° C., and preferably with dehydrated and decarbonated air, forced through the bed of granulates at linear velocities ranging between 0.01 and 1 m/second NTP. The process makes it possible to obtain novel zeolites with high nitrogen adsorption capacity.

10 Claims, 1 Drawing Sheet

PROCESS FOR THE THERMAL ACTIVATION OF ZEOLITES AND RESULTANT PRODUCTS

CROSS-REFERENCE TO RELATED APPLICATION

The instant application is a continuation-in-part of application Ser. No. 07/422,597, filed Nov. 29, 1989 now abandoned.

BACKGROUND OF THE INVENTION

The invention pertains to a process for thermal activation of zeolites by percolating a hot gas through a bed of granulates of these zeolites and, preferably, to a continuous process for such activation. It applies to zeolites which are degraded under the combined action of water vapor and temperature, and more particularly to the forms of type A and X zeolites exchanged by potassium or calcium. It produces activated zeolites with high adsorption capacity.

Zeolites are crystallized aluminosilicates possessing a calibrated porous network. Because of the exceptional porosity of their structure, they constitute a veritable screening tool on the molecular scale by the selective adsorption of molecules, the molecular selection being based either on steric effect or on polarity effect. Their name of "molecular sieves" is a statement of this property.

The industrial applications of zeolites are widely varied and include the processes of separation, purification and catalysis. Among the most valuable zeolites are zeolite A, the sodium hydrated form of which (zeolite NaA) has the formula:

$$Na_2O\ Al_2O_3\ 2SiO_2\ (4\ to\ 5)\ H_2O$$

and zeolite X, the sodium hydrated form of which has the formula:

$$Na_2O\ Al_2O_3\ (2\ to\ 3)\ 2SiO_2\ (5\ to\ 6)\ H_2O.$$

Zeolites have been broadly described in the literature and more specifically in the articles by Breck. They are easily exchanged in aqueous media by numerous cations, which modifies their adsorption properties. This is also the case when replacing the sodium with potassium, the pore size of the zeolite NaA is reduced by 4A° to 3A°. Thus, one obtains zeolites designed 3A or KA. On the other hand, by calcium exchange of the zeolite NaA, the pore size is increased by 4A° to 5A° and one thus obtains zeolites designated 5A or CaA.

Some uses of such exchanged zeolites A or X are presented below:

(i) Utilization of the zeolite CaA to separate normal paraffins from charges containing branched, aromatic and olefinic hydrocarbons. In such processes, the zeolite is brought into contact with the mixture of hydrocarbons, most often in vapor phase, where it is preferentially charged in linear molecules. After this, one recovers the adsorbate either by increasing the temperature or by reducing the pressure, or by scavenging with a compound acting as a desorbant.

(ii) Utilization of the zeolite CaA to separate permanent mixtures of gases (for example, $O_2/N_2$ mixtures in the enrichment of air with oxygen, $H_2/N_2$ mixtures in the purification of hydrogen). The processes in which these zeolites are used are known by the name of PSA (from the English name of the process "pressure swing adsorption"). They function according to the adsorption/desorption cycles by varying the pressure under isothermal conditions. (iii) Utilization of the zeolite NaX in decarbonation processes for gas desulfurization treatments.

(iv) Utilization of the calcium form CaX for the separations of $N_2/O_2$ mixtures.

After having carried out the ionic exchange and having agglomerated the resulting product (in general with about 20% by weight of a clay binder), it is necessary to proceed with elimination of the water incorporated in the structure to give the zeolite its adsorption properties. The best adsorption capacities that can be obtained are those of zeolites activated in the laboratory by degassing the dehydrated zeolites under vacuum. Industrially, one proceeds with thermal activation in ovens. It should be noted that the products thereby obtained have remarkably low adsorption capacities. This activity deficit, which is attributed to a hydrothermal degradation phenomenon, is very perceptible, namely, as concerns the adsorption capacities of sieves 5A and X for nitrogen, sieves 5A for carbon oxide, sieves 5A for paraffins and sieves X for carbon dioxide gas.

Among the processes which have been described to remedy this loss in activity, some tend to reduce the sensitivity of the exchanged zeolite to hydrothermal degradation by acting on the exchange conditions. They are, for example (i) Patent No. DD 226,864 (VEB) which claims a calcium exchange process for the zeolite 4A carried out at 25° C. on a zeolite NaA having a pNa (sodium proportion based on the cologarithm of its molar concentration) ranging between 0.8 and 1.9 and a $HN_3$ adsorption capacity ranging between 150 and 400 mL/G; and (ii) U.S. Pat. No. 2,908,549 (TEXACO) which discusses a calcium exchange process in the presence of solid lime and a calcium salt at a pH value maintained around 11 during the exchange, the calcium salt being indifferently the chloride or the formate.

Others act on the activation conditions, such as East German Patent No. DD 239,533 (Karl Marz University, Leipzig), which describes a process for activation of the zeolite 5A in the course of which a strong gaseous scavenging is carried out in a bed activated by a turbulent movement, while respecting the slow rate of temperature rise in the maximum water elimination areas.

However, nevertheless, these processes only provide zeolites whose adsorption capacities remain remarkably lower than the anticipated theoretical capacities.

SUMMARY OF THE INVENTION

The instant inventors have noted that one could very simply and unexpectedly make a significant improvement in the adsorption capacity by modifying the conditions of thermal activation, without it being necessary to change the prior stages of synthesis and exchange. The inventors have noted that, in contrast to the results of prior art discussed above one could obtain activated zeolites endowed with very substantially improved adsorption properties by proceeding with the activation by percolating a hot gas through a bed of the zeolite to be activated or any other accumulation of zeolite, provided that the said gas percolates through a bed whose particles preserve their relative arrangement during the entire activation process; i.e., there is substantially no agitation or fluidization of the bed.

Thus, the invention comprises a process, particularly a continuous process, for activation of zeolites that are sensitive to degradation by the combined action of water vapor and temperature, which comprises forming a substantially homogeneous bed of granulates of the said zeolite in its hydrated form, passing through this bed a current of preheated air whose velocity has been made substantially uniform and continuing the passage of gas through the bed until upon exiting from the granulate bed, the gas is at a constant temperature close to its entry temperature. The invention also relates to the zeolites made by this process.

DETAILED DESCRIPTION

Figure 1:
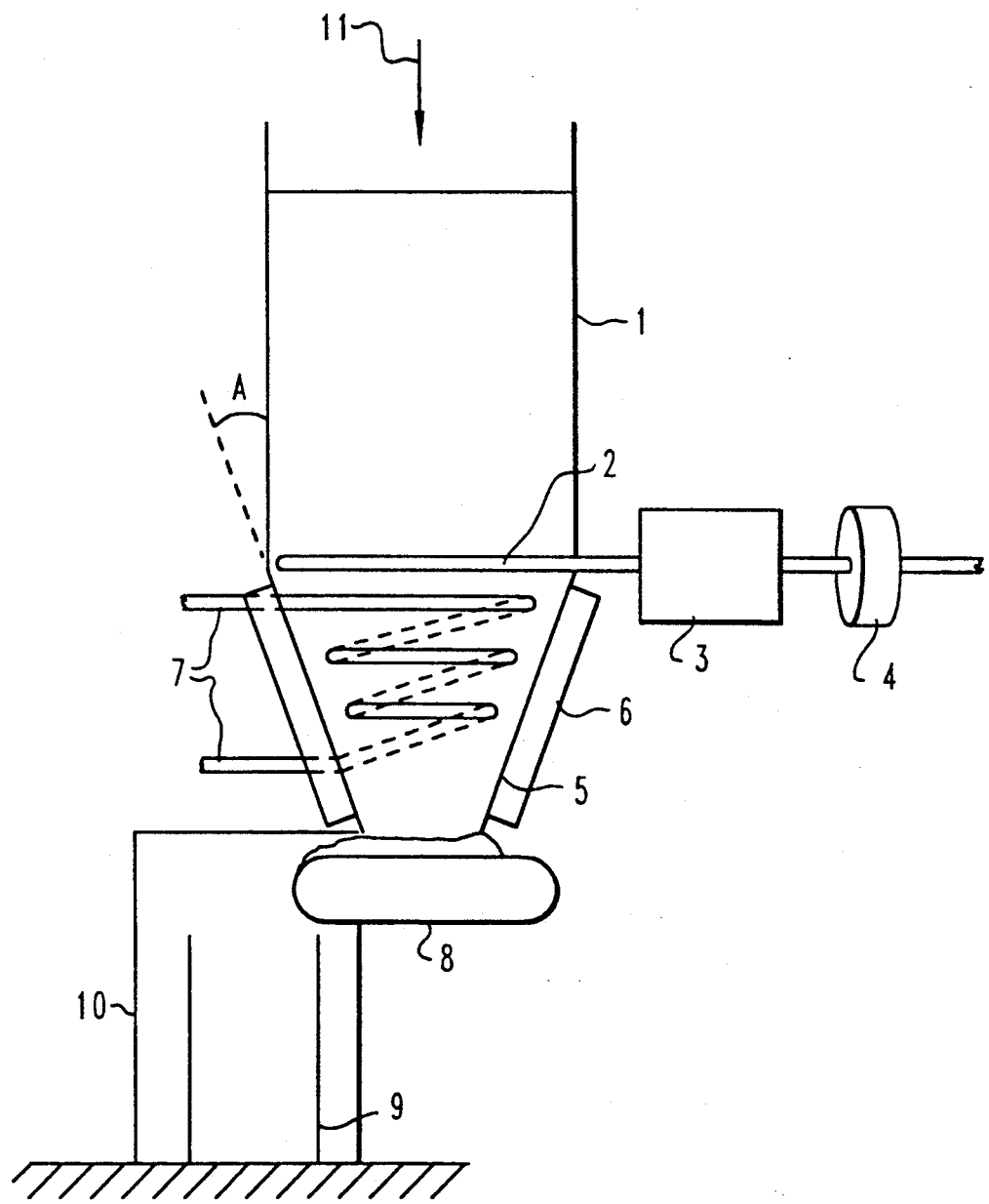
FIG. 1 is a schematic view of an apparatus system for carrying out the continuous process of the instant invention.

In a preferred mode of the invention, one carries out the activation in a metallic cylinder or column, which is closed at the bottom by a grid and which is filled uniformly with the sieve to be activated in the form of granulates according to the methods well known to the person skilled in the art for obtaining homogeneous packing. One forces a current of hot gas, either from bottom to top or from top to bottom through the bed of granulates. In the case of beds of great thickness installed in columns with a large diameter, it is advisable to provide air distributors so that, from the beginning of the column, the flow of the hot gas is the most uniform possible across the entire diameter. One can follow the advancement of the thermal front of heated air by measuring the temperature thereof, for example, by means of thermocouples placed at different levels in the cylinder or column. After the maximum desired temperature (that is, approximately the temperature to which the scavenging air has been preheated) is reached upon exiting the bed, one continues the operation for another 5 to 60 minutes to complete the dehydration of the zeolite, but especially to assure the hardening of the granulate binder. Then, one discharges, cools and packages or stores the zeolite away from the ambient air, for example in an inert atmosphere such as under a current of dry nitrogen. It was possible to verify that the method of activation according to the invention was not detrimental to the mechanical properties of the granulates.

The nature and quality of the scavenging gas is not without consequence on the quality of the end product. In can be air or an inert gas, and without inconvenience, one can use atmospheric air, but it is preferable to use dry air. The inventors obtained better results with a gas consisting air with a very low dew point (typically −60° C). Moreover, if this air with a very low dew point is decarbonated, the results are even more significantly improved.

The temperature of the scavenging gas ranges between 300° C., the minimum value below which the activation is no longer produced or is produced with a slowness that is incompatible with the requirements of an industrial process, and 700° C., a temperature above which the zeolitic structures undergo perceptible thermal damage. Preferably, the gas temperature is between about 555° to 600° C.

One works with linear velocities of gas passing through the layer of zeolite to be activated which are neither too slow, in which case one would restore the conditions of hydrothermal degradation, and not too rapid so as not to disturb the arrangement of granulate particles in the column. In practice, these velocities range between 0.01 m/second and 1 m/second normal temperature and pressure (NTP). The thickness of the layer of zeolite granulates, which are in the form of small balls or extrudates or other shapes conventionally used and are prepared by conventional means, can range between a single layer and several meters of granulates without being detrimental to the adsorption properties. The only limits as regards the height of the bed are of a practical order; that is, inadmissible losses in charges when the layers passed through reach too great thickness, and the absence of efficiency of columns working under reduced thickness. One can give thicknesses of 0.03 to 20 meters as acceptable for an industrial exploitation of the process according to the invention. This results, in the case of Zeolite A or X granulates formed by utilizing dried and decarbonated air with a nitrogen absorption capacity of at least 4 mg/g.

In accordance with the invention, it is also possible to carry out the activation in a continuous manner in a moving bed column and will be described in connection with the apparatus system of FIG. 1. The activator shown in FIG. 1 is comprised of a cylindrical column 1 containing the zeolite (not shown) to be thermally activated. A gas distributor or grid 2 allows introduction of gas at 600° C. by means of the exchanger 3; this gas is propelled by a compressor 4. Under the distrbutor level line is a conical hopper 5 with a double jacket 6 which makes it possible to cool the product before it is discharged. The angle A formed by this hopper with the vertical is 20°. A second cooling devise is comprised of a helicoidal water conduit 7 positioned at the center of the hopper. Under the hopper is a conveyor belt 8 which controls the mass flow of zeolite being discharged. The flow rate imposed by the belt 8 controls the entry flow rate 11 of fresh product ready for activation. A rotating device makes it possible to equalize the zeolite level and to avoid formation of a talus (not shown). The thermally activated zeolite is packaged at a temperature on the order of 80° C. into containers (drums) 9 sheltered from the ambient air by means of a caisson 10 with slight overpressure of dry air. In this activation mode, the relative flow rates of hot gas and zeolite are such that the thermal front is stabilized approximately half-way up the column. Under these conditions, the gas being discharged from the column is kept at a constant low temperature with a water content lower than the saturation point. In this context, low temperature is understood to mean a temperature of the zeolite to be activated which can be its storage temperature or, at maximum, its dryer discharge temperature.

The invention will be further described in connection with the following examples which are set forth for purposes of illustration only.

EXAMPLE 1

(COMPARATIVE)

Zeolite activation according to the known prior art on a non-traversed bed is carried out as set forth below.

In a cupel with a diameter of 23 cm, one pours on the grid 1.25 kg of dried zeolite 5A agglomerated with a clay binder at 20% by weight of binder in relation to the mixture and in the form of extrudates 1.6 mm in diameter, so as to form a 3.5 cm molecular sieve layer. This cupel is placed in the enclosure of an electric oven maintained at 575° C. for one and one half hours. The molecular sieve is discharged hot into a glass flask and cooled away from the air.

The nitrogen adsorption capacity of the 5A granulate thus activated is measured by a dynamic adsorption test in a column, at 25° C., under a partial nitrogen pressure of 157 mm of mercury (21 kPa), with helium as the vector gas. This adsorption capacity is 3.0 mg/g.

EXAMPLE 2

This example is based on extended activation on a thin traversed bed.

In a metallic tube with a diameter of 23 cm and the bottom of which is provided with a fine-mesh grind, one pours 1.25 kg of the zeolite 5A granulates of Example 1 to be activated, so as to form a bed with a thickness of about 3.5 cm. This layer is then passed through by a flow of 46 $Nm^3/h$ (Normal cubic meters/hour) of atmospheric air previously heated to 575° C. by passage over an electric resistance device. This flow corresponds to a linear velocity of 0.3 m/second NTP. After the exiting gases are approximately at the same temperature as at the entry to the apparatus, one continues heating for one hour and after this, the molecular sieve is discharged hot into a glass flask and cooled away from the air.

The nitrogen adsorption capacity of the zeolite 5A granulate thus activated measured as above is 4.4 mg/g.

EXAMPLE 3

This example is based on rapid activation on a thin traversed bed.

The conditions of Example 2 were repeated, except that the operation is stopped five minutes after the exiting gases are at 575° C.

The nitrogen adsorption capacity of the granulate is 4.4 mg/g and is not modified.

EXAMPLE 4

A thermal activation test similar to that of Example 2 is carried out, but with modification of the height of the molecular sieve layer. Five kg of molecular sieve are introduced to obtain a 17 cm layer. The bed of zeolite granulates is divided into four levels which are analyzed separately.

The nitrogen adsorption capacities between the upper and lower levels are, respectively, 4.15 mg/g, 4.22 mg/g, 4.21 mg/g and 4.21 mg/g, that is high and practically unchanged at all levels.

EXAMPLE 5

In this example, the activation of 1.25 kg of zeolite 5A granulated under the conditions of Example 2 is carried out, with the exception of the final temperature which is 350° C. The duration of maintenance at this temperature is 60 minutes.

The product thus obtained has a nitrogen adsorption capacity of 3.3 mg/g. However, this low capacity is the result of an incomplete dehydration and not a hydrothermal degradation. If the activation is continued in an electric oven up to 575° C., the nitrogen adsorption capacity rises to 4.24 mg/g.

EXAMPLE 6

The conditions of Example 5 are repeated, with the exception of the gaseous scavenging flow rate which is reduced to 3.6 (linear velocity: 0.022 m/second NTP). The product dehydrated according to the invention and the activation of which is continued at 575° C. in an electric over develops a saturated nitrogen adsorption capacity of 4.05 mg/g.

EXAMPLE 7

The activation test under the conditions of Example 5 is repeated, but on a thick layer in a metallic column with an internal diameter of 135 mm and a height of 2 m. The column is filled with about twenty kilograms of 1.6 mm extrudates of zeolite 5A so as to make a 175 cm layer. The sieve is then activated by making 40 $Nm^3/h$ of atmospheric air NTP circulate from bottom to top. One obtains a temperature of 350° C. at the bottom of the column. If the molecular sieve taken from the bottom of the column is activated in an electric oven, one obtains granulate which has a saturated nitrogen adsorption of 4.1 mg/g.

EXAMPLE 8

The conditions of Example 7 are repeated, but the heating power of the air is increased, such that one obtains an exit temperature of 550° C. from the bottom of the column. The zeolite directly obtained according to this method has an adsorption capacity of 4.24 mg/g.

EXAMPLE 9

The experiment of Example 2 is repeated, but this time the atmospheric air is replaced by air dried on a molecular sieve. The air used has a dew point of −60° C. The molecular sieve activated at 575° C., under 3.5 cm of layer and with a gas velocity of 0.3 m/second NTP presents a saturated nitrogen adsorption of 5.1 mg/g.

EXAMPLE 10

The conditions of Example 9 are repeated, but the atmospheric air used for the activation is replaced by air dried such that its dew point is −60° C. and also decarbonated to less than 10 ppm of $CO_2$ on a 13X molecular sieve column. One obtains an agglomerated zeolite whose nitrogen adsorption capacity is 5.35 mg/g.

EXAMPLE 11

One charges a metallic column of 135 mm internal diameter and 2 m height with about twenty kilograms of 1.6 mm extrudates of 5A zeolite so as to create a 175 cm layer. The sieve is then activated by making 40 $Nm^3/h$ of atmospheric air NTP, dried and decarbonated such that its dew point is −60° C. and its $CO_2$ content is less than 10 ppm and brought to 550° C., circulate from the bottom to the top. After the temperature at the bottom of the column has stabilized near its admission temperature, one continues heating for another 50 minutes. One thus obtains a agglomerate of activated zeolite whose nitrogen adsorption capacity if 5.35 mg/g.

EXAMPLE 12

One exchanges a zeolite X by means of $CaCl_2$ so as to obtain an exchange rate of 83% in number of $Na^+$ equivalents replaced. The product is then agglomerated according to the conventional methods by means of a clay binder at 20% by weight of binder in the final product.

The agglomerate is then activated in the activation column with traversed bed, at a temperature which is here 600° C., the height of the zeolite layer being 7 cm and the gas flow rate being 40 $Nm^3$ per hour. One obtains a granulate of activated zeolite whose nitrogen adsorption capacity at 25° C. and under 157 mm of mercury (21 kPa) is 6.67 mg/g. The same zeolite activated in an oven has adsorption capacity which is only 3.46 mg/g.

While the invention has been described in connection with a preferred embodiment, it is not intended to set forth, but on the contrary, it is intended to cover such alternatives, modifications, and equivalents as may be included within the spirit and scope of the invention as defined by the appended claims.

What is claimed is:

1. A process for activation of zeolites A or X that are sensitive to degredation by the combined action of water vapor and temperature to produce activated zeolites with a nitrogen adsorption capacity, of at least 4 mg/g comprising forming a substantially homogeneous bed of granulates of said zeolite in its hydrated form, passing through said bed a current of a preheated, non-acid, dry gas at a substantially uniform velocity through the bed, continuing the passage of gas through said bed until, upon exiting from the bed, the gas is at a constant temperature close to its entry temperature at which time the activation is completed, and the removing and packing said activated zeolites without exposing said zeolite to the ambient air.

2. The process of claim 1, wherein the activation is carried out in an intermittent manner in a fixed bed column.

3. The process of claim 1, wherein the activation is carried out in a continuous manner in a moving bed and the water content of said preheated gas as it exits said bed being lower than its saturation water content at said constant temperature.

4. The process of claim 1, 2, or 3 wherein the gas passed through the bed of zeolite granulates is air preheated to a temperature between about 300° C. to 700° C.

5. The process of claim 1, 2, or 3 wherein the gas passed through the bed of zeolite granulates is air preheated to a temperature between about 550° C. and about 600° C.

6. The process of claim 1, 2, or 3 wherein air heated between about 300° C. to 550° C. is passed through the bed of zeolite granulates for a time sufficient to effect partial activation of the zeolite granulates and activation is completed by heating in an oven at temperatures ranging between about 550° C. to 700° C.

7. The process of claim 1, 2, or 3 wherein the uniform velocity of the preheated gas ranges between about 0.01 and 1 m/second Normal Temperature and Pressure.

8. The process of claim 1, 2, or 3 in which the air used is air that has been previously dried.

9. The process of claim 1, 2, or 3 in which the air used has been previously dried and decarbonated.

10. The process of claim 1, 2, or 3 in which the thickness of the bed of zeolite granulates ranges between about 0.03 to 20 meters and after activation the zeolite is kept in an inert atmosphere.

* * * * *